United States Patent
Li et al.

(10) Patent No.: US 10,678,550 B2
(45) Date of Patent: Jun. 9, 2020

(54) CAPTURING SNAPSHOTS OF OFFLOAD APPLICATIONS ON MANY-CORE COPROCESSORS

(71) Applicant: NEC Laboratories America, Inc., Princeton, NJ (US)

(72) Inventors: Cheng-Hong Li, Princeton, NJ (US); Giuseppe Coviello, Plainsboro, NJ (US); Srimat Chakradhar, Manalapan, NJ (US); Arash Rezaei, Raleigh, NC (US)

(73) Assignee: NEC Corporation (JP)

( * ) Notice: Subject to any disclaimer, the term of this patent is extended or adjusted under 35 U.S.C. 154(b) by 776 days.

(21) Appl. No.: 14/572,153

(22) Filed: Dec. 16, 2014

(65) Prior Publication Data

US 2015/0212892 A1    Jul. 30, 2015

Related U.S. Application Data

(60) Provisional application No. 61/931,245, filed on Jan. 24, 2014, provisional application No. 61/931,315, filed on Jan. 24, 2014.

(51) Int. Cl.
| | |
|---|---|
| *G06F 9/30* | (2018.01) |
| *G06F 9/38* | (2018.01) |
| *G06F 9/48* | (2006.01) |
| *G06F 11/20* | (2006.01) |
| *G06F 11/14* | (2006.01) |

(52) U.S. Cl.
CPC .......... *G06F 9/3863* (2013.01); *G06F 9/3009* (2013.01); *G06F 9/3877* (2013.01); *G06F 9/4856* (2013.01); *G06F 11/1438* (2013.01); *G06F 11/1446* (2013.01); *G06F 11/203* (2013.01); *G06F 11/2043* (2013.01); *G06F 2201/825* (2013.01); *G06F 2201/84* (2013.01); *G06F 2209/509* (2013.01)

(58) Field of Classification Search
None
See application file for complete search history.

(56) References Cited

U.S. PATENT DOCUMENTS

| | | | |
|---|---|---|---|
| 9,158,540 B1 * | 10/2015 | Tzelnic | G06F 3/06 |
| 2007/0277056 A1 * | 11/2007 | Varadarajan | G06F 11/1438 714/15 |
| 2012/0011519 A1 * | 1/2012 | Ganesh | G06F 9/4856 718/105 |

OTHER PUBLICATIONS

Hursey et al.; Interconnect Agnostic Checkpoint/Restart in Open MPI; 2009; ACM.*

(Continued)

*Primary Examiner* — Corey S Faherty
(74) *Attorney, Agent, or Firm* — Joseph Kolodka

(57) ABSTRACT

Methods are provided. A method includes capturing a snapshot of an offload process being executed by one or more many-core processors. The offload process is in signal communication with a host process being executed by a host processor. At least the offload is in signal communication with a monitoring process. The method further includes terminating the offload process on the one or more many-core processors, by the monitor process responsive to a communication between the monitor process and the offload processing being disrupted. The snapshot includes a respective predetermined minimum set of information required to restore a same state of the process as when the snapshot was taken.

9 Claims, 8 Drawing Sheets

(56) References Cited

OTHER PUBLICATIONS

Sankaran et al.; The LAM/MPI Checkpoint/Restart Framework: System-Initiated Checkpoint; 2005; Sage Publications.*

Takizawa, H., et al. "CheCL: Transparent Checkpointing and Process Migration of OpenCL Applications" 2011 IEEE International Parallel & Distributed Processing Symposium. May 2011. pp. 864-876.

* cited by examiner

CAPTURING SNAPSHOTS OF OFFLOAD APPLICATIONS ON MANY-CORE COPROCESSORS

RELATED APPLICATION INFORMATION

This application claims priority to provisional application Ser. No. 61/931,245 filed on Jan. 24, 2014 and to provisional application Ser. No. 61/931,315 filed on Jan. 24, 2014, incorporated herein by reference.

BACKGROUND

Technical Field

The present invention relates to data processing, and more particularly to capturing snapshots of offload applications on many-core coprocessors.

Description of the Related Art

Intel Xeon Phi® coprocessors provide excellent performance acceleration for highly parallel applications and have been deployed in several top-ranking supercomputers. One popular approach of programming the Xeon Phi is the offload model, where parallel code is executed on the Xeon Phi, while the host system executes the sequential code. However, Xeon Phi's Many Integrated Core Platform Software Stack (MPSS) lacks fault-tolerance support for offload applications.

SUMMARY

These and other drawbacks and disadvantages of the prior art are addressed by the present principles, which are directed to capturing snapshots of offload applications on many-core coprocessors.

According to an aspect of the present principles, a method is provided. The method includes capturing a snapshot of an offload process being executed by one or more many-core processors. The offload process is in signal communication with a host process being executed by a host processor. At least the offload is in signal communication with a monitoring process. The method further includes terminating the offload process on the one or more many-core processors, by the monitor process responsive to a communication between the monitor process and the offload processing being disrupted. The snapshot includes a respective predetermined minimum set of information required to restore a same state of the process as when the snapshot was taken.

According to another aspect of the present principles, a method is provided for performing a checkpoint of an offload process executing on a coprocessor. The method includes issuing a snapify_pause request from a host processor to the coprocessor to initiate a pausing of the offload process executing by the coprocessor and another process executing by the host processor using a plurality of locks. The offload process is offloaded from the host processor to the coprocessor. The method further includes issuing a snapify_capture request from the host processor to the coprocessor to initiate respective local snapshot captures by the host processor and the coprocessor. The method also includes issuing a snapify_wait request from the host processor to the coprocessor to wait for a copy snapshot function to complete by the coprocessor. The method additionally includes issuing a snapify_resume request from the host processor to the coprocessor to initiate releasing of the plurality of locks acquired from the pausing of operations.

According to yet another aspect of the present principles, a method is provided for restoring an offload process at a coprocessor. The method includes issuing a snapify_restore request from a host processor to the coprocessor to initiate the restoring of the offload process at the coprocessor. The offload process is offloaded from the host processor to the coprocessor. The method further includes issuing a snapify_resume request from the host processor to the coprocessor to release blocked threads in the host processor and the coprocessor.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
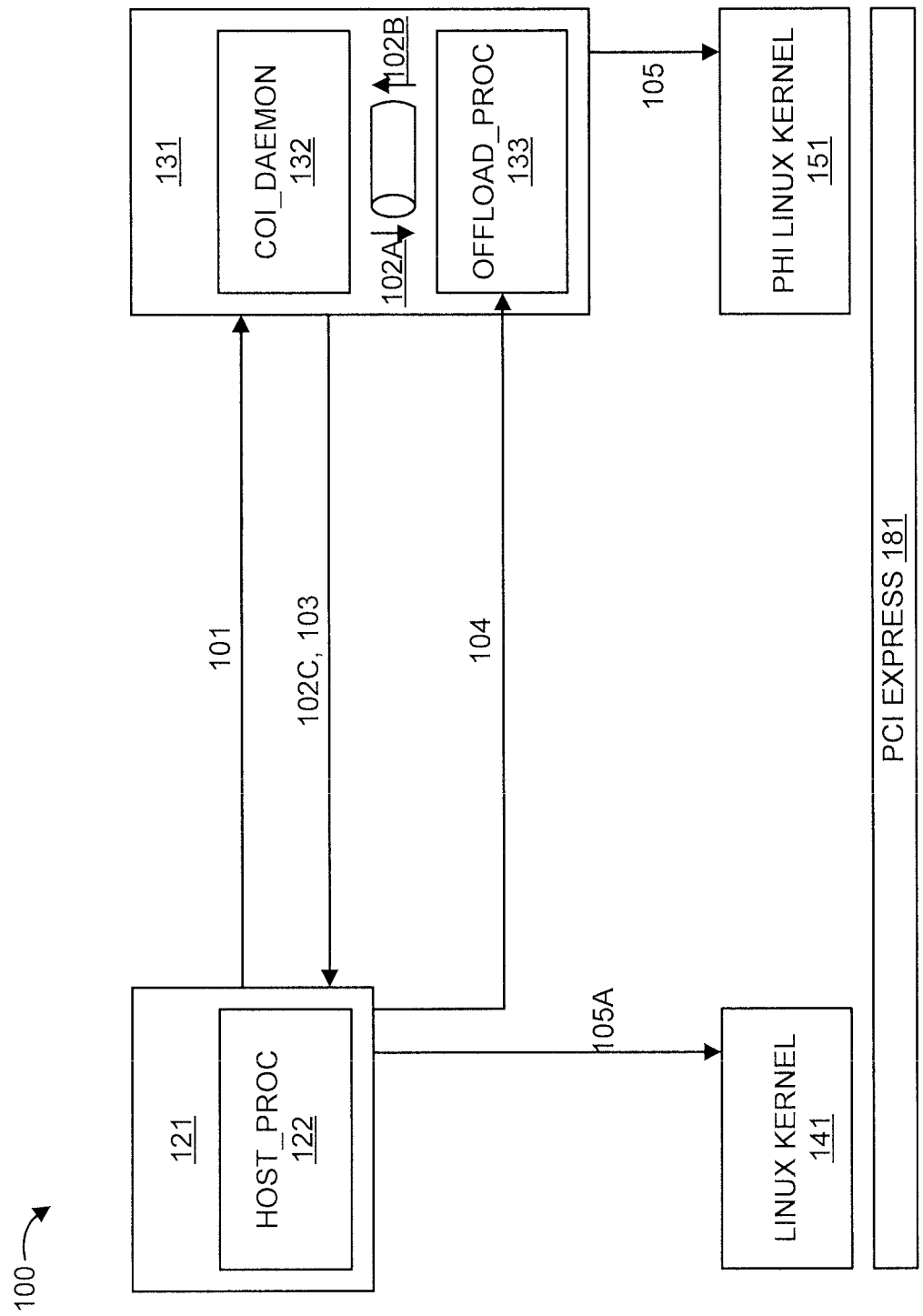
FIG. 1 shows an exemplary system/method 100 for taking a snapshot in a many-core co-processing environment, in accordance with an embodiment of the present principles.

The present principles are directed to capturing snapshots of offload applications on many-core coprocessors. Advantageously, the present principles also are directed to applications that use such snapshots. These applications include checkpoint and restart, swap, and migration.

As used herein, the present principles provide a set of extensions, interchangeable referred to herein as Snapify, to the Xeon Phi's Many Integrated Core Platform Software Stack (MPSS). In an embodiment, Snapify provides the following three novel features for Xeon Phi offload applications: checkpoint and restart; process swapping; and process migration. The core technique of Snapify is to take consistent process snapshots of the communicating offload processes and their host processes. To reduce the Peripheral Component Interconnect (PCI) latency of storing and retrieving process snapshots, Snapify uses a novel data transfer mechanism based on remote direct memory access (RDMA). Snapify can be used transparently by single-node and Message Passing Interface (MPI) applications, or be triggered directly by job schedulers through Snapify's Application Programming Interface (API).

Thus, in accordance with the present principles, three techniques are disclosed for many-core-coprocessor-based servers (e.g., Xeon Phi-based servers). The first technique is referred to herein as "checkpoint and restart (CR)". The second technique is referred to herein as "process swap". The third technique is referred to herein "process migration". We will describe each of them and discuss how they can be used to solve the aforementioned problems.

To protect a long-running job on a Xeon Phi server from hardware failures, the disclosed checkpoint and restart technique takes "snap shots" of the processes running on the host processor and the Xeon Phi accelerators in predetermined time intervals. These snap shots include enough information so that in the case of a hardware failure or a software error, the snap shot can be used to restore the process to the exact state when the snap shot was taken. Therefore, even in the presence of failure, a job can be restarted from some intermediate state, instead of being started all over again.

The swap mechanism can be employed to overcome the physical memory constraint on a Xeon Phi accelerator and to balance the workload across a number of Xeon Phi accelerators. The mechanism can swap out an offload process from the Xeon Phi coprocessor so all of the resources held by the swapped-out process, including but not limited to memory, are released. The swap mechanism stores the process image in the host memory or permanent storage (including, but not limited to a disk) so the offload process can be later restored on the Xeon Phi. The released resources are returned to the operating system and thus can be reused by other processes. Therefore, the swap mechanism allows simultaneous execution of multiple processes whose aggregate memory footprint on the Xeon Phi exceeds the Xeon Phi's physical memory.

The process migration method addresses both the aforementioned reliability and load balancing issues. The migration mechanism can dynamically migrate an active offload process from one Xeon Phi coprocessor to another on the same server. Combined with a failure prediction technique, the migration mechanism can also be used to address the reliability issue faced by long-running jobs: if an imminent failure of a Xeon Phi is detected, the offload processes running on the Xeon Phi device can be migrated to another healthy Xeon Phi to continue their work. For load balancing, the migration method can be used by a scheduler or a resource manager to migrate some of the offload processes on an overloaded Xeon Phi device to another less loaded one.

We note that there are two ways that an application can use a Xeon Phi processor(s) to accelerate its computation. The application can be compiled to execute "natively" on a Xeon Phi device from beginning to end. On the other hand, an application can be programmed in such a way that only part of its computation is "offloaded" to execute on one or more Xeon Phi processors. We call the first type of applications native applications, while the second offload applications. In the following we will focus on offload applications.

A description will now be given of the programming model for an offload application, in accordance with an embodiment of the present principles.

To program an offload application, a programmer uses special compiler directives to delineate regions of code to be executed on Xeon Phi processors. In particular, the pragma "offload" is used to mark an offload region with language-specific scoping constructs (e.g., including, but not limited to, curly braces in C, and "begin" and "end" in Fortran).

A description will now be given regarding a Xeon Phi compiler and corresponding compile time actions, in accordance with an embodiment of the present principles.

The Xeon Phi compiler generates one binary for the host processor and one binary for the Xeon Phi coprocessor for an offload application. The host binary is an executable, while the Xeon Phi binary is a dynamically loadable library. The compiler translates each offload region as a function to be executed on the Xeon Phi coprocessor and saves the generated code in the Xeon Phi binary. For each offload region, in the host binary the compiler also generates a function call to the lower-layer runtime libraries, which coordinate the data transfer between the host and the Xeon Phi coprocessor and initiate the "remote" procedure call of the offload function.

A description will now be given regarding the execution of an offload processor and related processes, in accordance with an embodiment of the present principles.

FIG. 1 shows an exemplary system/method 100 for taking a snapshot in a many-core co-processing environment, in accordance with an embodiment of the present principles.

The execution of an offload application to be accelerated by one Xeon Phi device involves a minimum of three processes, as shown in FIG. 1. The three processes are a host process 122 ("host_proc" in FIG. 1) running on the host processor 121, an offload process 132 ("offload_proc" in FIG. 1) running on a Xeon Phi device (hereinafter also Xeon Phi or Xeon Phi coprocessor) 131, and a daemon 133 ("coi_daemon" in FIG. 1) also running on the Xeon Phi 131. The host processor 121 and the Xeon Phi device 131 are interconnected using Peripheral Component Interconnect (PCI) express 181. In general, a user launches the application host_proc on the host processor 121. Reference numeral 141 denotes a Linux Kernel, and reference numeral 151 denotes a Phi Linux Kernel. At a certain point in time, host_proc 122 will ask coi_daemon 133 to launch offload_proc 132 on the Xeon Phi 131. The Xeon Phi binary of the offload functions are copied to the Xeon Phi 131 and dynamically loaded into offload_proc's memory space. Before the execution of an offload function, the host process 122 will transfer the input data needed by the offload region to the offload_proc's memory space. Then host_proc 122 will signal offload_proc 132 to call the function of the offload region. Once the function completes on Xeon Phi 131, offload_proc 132 will transfer its returned value back to host_proc 122. The host_proc 122 may also transfer any data generated by the offload region from offload_proc 132 back to host_proc's memory space on the host.

A description will now be given regarding inter-process communications, in accordance with an embodiment of the present principles.

The runtime libraries provide different levels of abstractions to facilitate the communications between the host process and the processes running on the Xeon Phi. The Coprocessor Offload Infrastructure (COI) library is an upper level library offering APIs for a host process to perform process control and remote function calls on a Xeon Phi coprocessor. It also allows a host process to create buffers, called COI buffers, on the coprocessor and transfer data between the host process and the buffers allocated in the offload process. The COI library in turn uses the lower level Symmetric Communications Interface (SCIF) library to accomplish the real message exchanges and data transfers between the host process and the offload process.

A description will now be given regarding the role of coi_daemon, in accordance with an embodiment of the present principles.

Each Xeon Phi device runs one coi_daemon process to coordinate the execution of offload processes and the corresponding host processes. Coi_daemon maintains SCIF connections with each active host process that offloads part of its computation to Xeon Phi through the COI library. The connections are used to communicate the process control messages between host processes and coi_daemon. For example, coi_daemon launches new offload processes upon requests from applications on the host. Once a new offload process is created, coi_daemon continues to monitor its progress. If the offload process is terminated, coi_daemon will inform its host process about the termination. On the other hand, if the SCIF connections between the host process and coi_daemon are closed, coi_daemon will assume that the host process has existed, terminate any offload processes requested by the host process, and clean up the temporary files and the resources used by the offload processes.

A description will now be given regarding problems that can be encountered in taking snapshots.

Symmetric Communications InterFace (SCIF) provides two types of Application Programming Interfaces (APIs) that allow two processes in different memory space to communicate. The first type is message-based. The processes use scif_send( ) and scif_receive( ) to send and receive data. The second type offers remote direct memory access (RDMA) functions to speed up the data transfer. To use SCIF's RDMA functions to transfer a buffer, a process first registers the buffer's virtual memory address using scif_register( ) call. If successful, the function returns an offset address that represents the physical address of the buffer. The registered buffer can then be accessed remotely through the offset address.

All of the three mechanisms disclosed herein rely on taking "snapshots" (or "checkpoints") of the active host processes or their offload processes. A snapshot or a checkpoint of a process at a particular process state includes the necessary information to restart the execution of a process from the exact same state. Such information includes memory pages allocated to the process, process-private data structures in the OS, and possibly opened files in the file system. The checkpoint and restart mechanism disclosed here takes snapshots of the host processes, and of each of the offload processes requested by the host process. The swap and migration mechanisms only take snapshots of the offload processes. Regardless, all three mechanisms do not take snapshots of coi_daemon.

Although the problem of taking a snapshot of a process has been extensively studied, the hardware configuration and the software environment of a Xeon Phi-enabled server pose several new challenges to taking process snapshots, which are described below.

The first problem is that for an offload application the three involved processes are communicating. Since any messages that are still under transmission cannot be saved, before a snapshot can be taken all of the communication channels need to be "emptied", that is, the channels have no active messages being sent or received.

The second problem is that the connections need to be rebuilt during the restart of a process. This means that any data structures associated with the original connections prior to the checkpoint will become invalid after the connections are rebuilt during the restart. The internal data structure maintained by the SCIF device driver for an open connection is such an example. Therefore the snapshot should exclude these data structures to avoid resource leaks.

Although closing the connections before a snapshot is taken is the most reasonable solution to the problem of the aforementioned resource leaks, such an approach brings up another issue. Since coi_daemon constantly monitors the connections to host processes, closing the connections between coi_daemon and a host process in the action of taking a snapshot will cause coi_daemon to incorrectly terminate the offload process that is associated with the host process. Therefore coi_daemon needs to be made aware of the snapshot activities.

Herein, we disclose a method of robustly taking snapshots of host processes and their associated offload processes on a Xeon Phi server. The method is used in all of the three mechanisms that increase reliability and utilization of Xeon Phi servers: checkpoint and restart; swap; and migration.

The method of taking a snapshot relies on a novel 3-way protocol between a host process, coi_daemon, and an offload process associated with the host process. The protocol is conducted prior to a snapshot of either the host or the offload process is taken. Its main purpose is to synchronize the three processes, so a proper order of actions can be taken to ensure a snapshot can be successfully taken and all three processes can continue their tasks smoothly afterwards.

Figure 2:
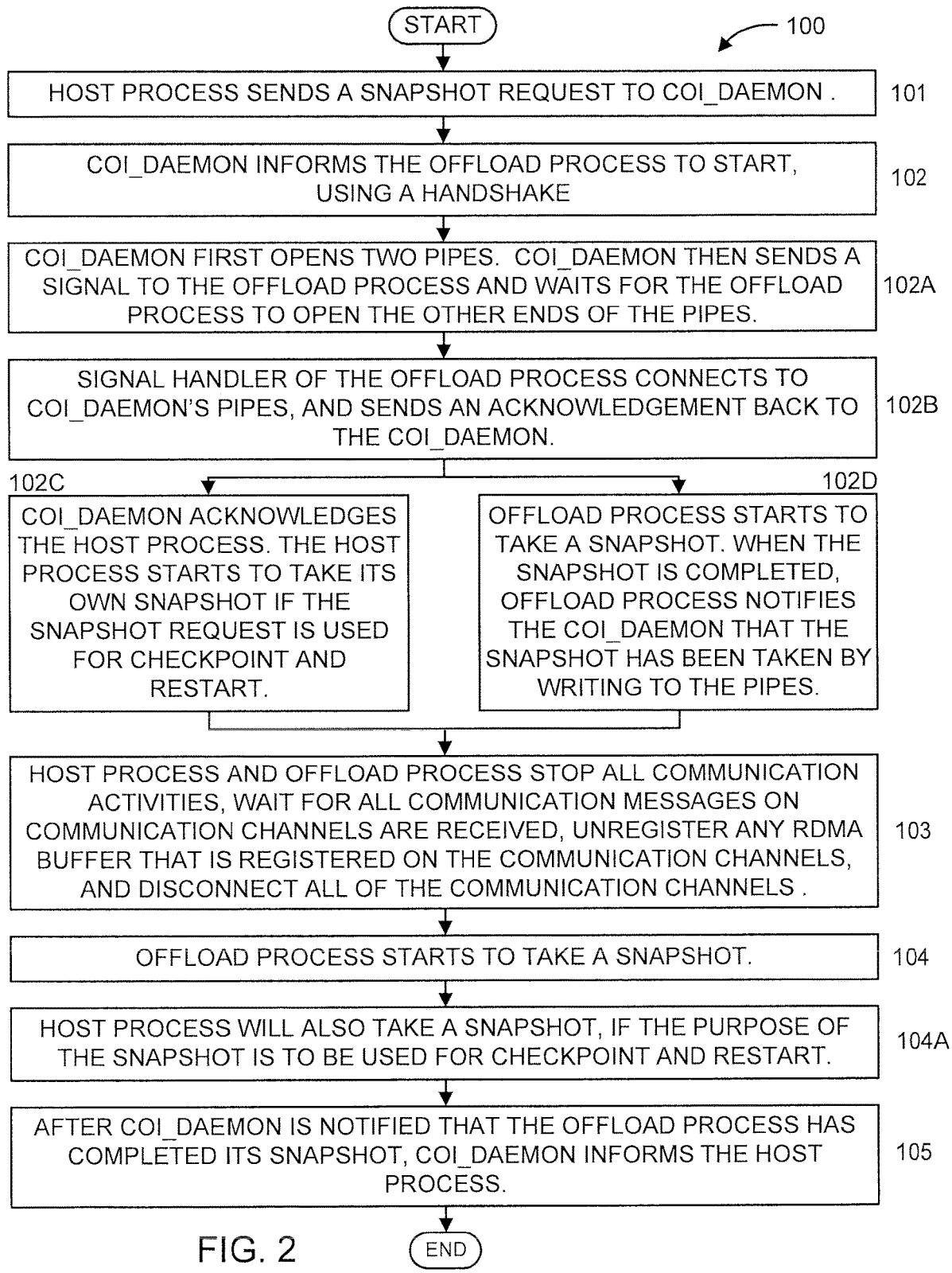
FIG. 2 shows a detailed sequence of steps that are performed to take a snapshot of a process on many-core coprocessors, in accordance with an embodiment of the present principles.

The protocol is explained step-by-step below as follows with regard to FIGS. 1 and 2. Thus, reference is now made back to FIG. 1 as well as to FIG. 2. FIG. 2 shows an exemplary method 200 for capturing a snapshot of an offload application for a many-core coprocessor, in accordance with an embodiment of the present principles.

To take a snapshot, first the host process sends a snapshot request to coi_daemon (step 101). The request message also includes a field indicating the purpose (checkpoint and restart, swap, or migration) of the snapshot.

Once coi_daemon receives the request from the host process for taking a snapshot, coi_daemon will inform the offload process to start, using a handshake (step 102). This is achieved by the following handshake between coi_daemon and the offload process:

Step 102A. Coi_daemon first opens two pipes. Coi_daemon then sends a signal to the offload process and waits for the offload process to open the other ends of the pipes.

Step 102B. The signal handler of the offload process connects to coi_daemon's pipes, and sends an acknowledgement back to the coi_daemon.

Step 102C. Coi_daemon acknowledges the host process. The host process starts to take its own snapshot if the snapshot request is used for checkpoint and restart.

Step 102D. In parallel to step 102C, the offload process starts to take a snapshot. When the snapshot is completed, the offload process notifies the coi_daemon that the snapshot has been taken by writing to the pipes.

The host process and the offload process stop all communication activities, wait for all communication messages on communication channels are received, unregister any RDMA buffer that is registered on the communication channels, and disconnect all of the communication channels (step 103).

The offload process starts to take a snapshot (step 104). If the purpose of the snapshot is to be used for checkpoint and restart, the host process will also take a snapshot (step 104A). The snapshot(s) are saved to permanent storage.

After coi_daemon is notified that the offload process has completed its snapshot, coi_daemon informs the host process (step 105). After the offload process completes its snapshot (step 105), it will inform coi_daemon through the pipelines that established in step 102 that it is ready to resume. Independently, the host process will send a "resume" command along with necessary information to rebuild the communication channels to coi_daemon. Once coi_daemon receives confirmation from both the host process and the offload process that they can resume, coi_daemon forwards the information from the host process to rebuild the communication to the offload process. The offload process uses this information to rebuild the communication back to the host process.

Both the host process and the offload process use the reestablished communication channels to reestablish the RDMA buffers.

Any thread that is paused to sleep is woken up to continue their original activities.

In order to minimize the disruption to the normal functionality of coi_daemon, coi_daemon uses a separate thread to monitor snapshot progress concurrently. After coi_daemon receives the acknowledgement from the offload process through the pipes in Step 102B, coi_daemon adds a new entry to the snapshot task queue that it maintains Each entry in the queue corresponds to an ongoing snapshot request. Then coi_daemon spawns a snapshot service thread to poll the opened pipes connected to offload processes working on snapshots. After the snapshot service thread receives a response on a pipe from an offload process, which indicates that the offload process has finished the snapshot, the snapshot service thread will remove the corresponding snapshot entry from the snapshot task queue.

After the three-way protocol is conducted, the host process and its associated offload process will prepare to take a snapshot. During the preparation of taking a snapshot, all of the SCIF communications between the host process, the coi_daemon, and the offload processes are closed. This is necessary to avoid resource leaks and to avoid losing any messages that is still being transferred on the fly and thus cannot be recorded in the snapshot. Since coi_daemon has been notified in the protocol that a snapshot is going to be taken, it will tolerate the broken communication links between itself and the host process.

A description will now be given of the procedure of taking a snapshot, in accordance with an embodiment of the present principles. TABLE 1 shows the Application Programming Interface for Snapify.

TABLE 1

```
typedef struct {      char* m_snapshot_path; sem_t m_sem;
                      COIProcess* m_process;
                      } snapify_t;
void snapify_pause (snapify_t* snapshot);
void snapify_capture(snapify_t* snapshot, bool terminate);
void snapify_wait (snapify_t* snapshot);
void snapify_resume (snapify_t* snapshot);
void snapify_restore (snapify_t* snapshot, int device);
```

Taking a snapshot of an offload process involves the host process on the host and the COI daemon and the offload process on each of the coprocessors installed in a Xeon Phi server. Although our approach handles multiple Xeon Phi coprocessors in a server, for simplicity we assume there is only one Xeon Phi coprocessor in the following discussions. Therefore we consider the case of three involved processes: the host process, the COI daemon, and the offload process. The snapshot process is accomplished in two separate steps. In step one, all of the communications between the host process and the offload process are stopped, and the channels are emptied. In step two, a snapshot of the offload process is captured and saved in the file system of the host. These two steps are implemented by snapify_pause( ) and snapify_capture( ) respectively. To pause the communications between the host process and the offload process, the host process calls snapify_pause( ) and passes the handle of the offload process (COIProcess in the structure) to snapify_pause( ) A directory structure in the host's file system for storing the files of a snapshot is also needed by snapify_pause( )(and snapify_capture( ). The path to the directory is passed to snapify_pause( ) through the member variable m_snapshot_path. In the first step of snapify_pause( ) it saves the copies of the runtime libraries from the host's file system needed by the offload process to the snapshot directory.

FIG. 1 shows the interactions between the host process, the COI daemon, and the offload process that are triggered by MPSS maintains copies of the runtime libraries on the host file system. Therefore as an optimization we do not copy the libraries of the offload process from the coprocessor back to the host system.

Function snapify_pause( ) first sends a snapify-service request to the COI daemon. The daemon then creates a UNIX pipe to the offload process, and writes the pause request to the offload process. Next the daemon signals the offload process, triggering the signal handler in the offload process to the pipe and sends an acknowledgement back to the daemon through the pipe. The daemon then relays the acknowledgement back to the host process. At this point all parties (the host process, the offload process, and the COI daemon) have agreed to pause the communications and empty the communication channels.

The COI daemon is chosen as the coordinator of Snapify's pause procedure. This is because there is one daemon per coprocessor, and each daemon listens to the same fixed SCIF port number. The COI daemon services pause requests that may come from different host processes. The COI daemon also maintains a list of active requests. Upon receiving a new pause request, the daemon adds an entry to the list. The entry is removed after the pause request is serviced. To avoid any interference with its regular tasks, the daemon uses a dedicated Snapify monitor thread to oversee the progress of the pause procedure. Whenever a request is received and no monitor thread exists, the daemon creates a new monitor thread. The monitor thread keeps polling the pipes to the offload processes on the list of active pause requests for status updates. The monitor thread exits when there is no more active pause request in the list. Following the initial handshake snapify_pause( ) sends a pause request to the offload process to empty the communication channels. The emptying procedure needs the collaboration between the host process, the COI daemon, and the offload process, and will be discussed in more detail shortly. It is a necessary step to ensure that the snapshots form a consistent global state. During the emptying process some of the threads in the host process and the offload process spawned by the COI library are blocked. The blocking of these threads keeps the SCIF channels from being used until snapify_resume( ) is called. These threads are responsible for sending and receiving COI commands, COI events, and the COI logs. After the SCIF channels are emptied, the offload process will save its local store (memory allocated in the offload process's memory space for storing data in COI buffers) to the host's snapshot directory. This operation does not use any existing SCIF channels between the host process and the offload process. (Saving the local store and the snapshot is discussed in detail later). At the end of snapify_pause( ) all of the SCIF channels between the host process, the COI daemon, and the offload process become empty. To notify the host process that the pause has completed, the offload process sends a message through the pipe to the COI daemon, and the COI daemon informs the host process that the offload process has completed the pause operation. After this the offload process waits on the pipe to wait for the next request from the host process. The next request is either a capture or a resume request, which will be discussed later.

We now give more details on how snapify_pause( ) empties the SCIF communication channels. We first classify all SCIF communication use instances in the COI runtime to four different cases.

1. The host process, the offload process, and the COI daemon exchange messages when an offload process is created and before it is destroyed. These messages carry information regarding process creation, confirmation, request for termination, and etc.

2. The host process and the offload process use one SCIF channel to perform RDMA transfers of the data in COI buffers. The RDMA transfers are carried out by scif_writeto( ) and scif_readfrom( ) functions.

3. The host process, the COI daemon, and the offload process have several pairs of client-server threads. Each server thread serves only one client thread. It handles the incoming commands in a sequential fashion. The commands are sent by the client thread through a dedicated SCIF channel.

4. The execution of an offload function is also implemented by a client-server model. In order to take a snapshot during the execution of an offload function, however, we treat this case separately. Our method handles both synchronous and asynchronous offload executions.

For each of the four use cases of SCIF we develop a method to empty the SCIF communication channels.

For case 1, we declare the initialization and cleanup code regions of creating and terminating offload processes as critical regions, protected by a mutex lock. When snapify_pause( ) is called, it will try to acquire the lock. If a thread is executing the code in a critical region, snapify_pause( ) will be blocked until the thread leaves the critical region. On the other hand, once snapify_pause( ) holds the lock, any other thread that attempts to enter these critical regions will be blocked.

For case 2 we delay any snapshot attempt when a RDMA transfer is active. Similar to the case above, we protect the call sites of SCIF's RDMA functions with mutex locks.

To handle a SCIF channel in the client-server model of case 3, we take advantage of the sequential nature of the client-server implementation in COI. We added a new "shutdown" request to the server's request handling routine. This request is only issued by snapify_pause( ) and is used as a special marker that indicates no more commands will follow until snapify_resume( ) is called. To send the shutdown request, snapify_pause( ) first tries to acquire the lock that is used by the client thread to protect the communication channel. After snapify_pause( ) acquires the lock, the client thread will not be able to send any more requests. The lock that is used by a client thread will only be released in snapify_resume( ) After acquiring the lock snapify_pause( ) sends the shutdown request to the server. The pause function will not continue until all of the server threads in the host process, the COI daemon, and the offload process receives a shutdown command. This ensures that the SCIF channels used between the client and the server threads stay empty until snapify_resume( ).

For case 4 to empty the SCIF channel used by Pipe_Thread1 and Pipe_Thread2 we made a number of changes to the implementation of the COI pipeline. First we transformed the two send functions to be blocking calls. We then placed these two send functions in two separate critical regions protected by mutex locks. The thread executing snapify_pause( ) in the host process and in the offload process will acquire these locks. The locks will be released in snapify_resume( ) To capture a snapshot of an offload process the host process calls snapify_capture( ) Similar to snapify_pause( ) the caller of snapify_capture( ) passes the handle to the offload process and the path to the directory on the host's file system where the snapshot files should be saved. It also gives a Boolean variable terminate to indicate whether the offload process should be terminated after its snapshot is captured. At the beginning snapify_capture( ) sends the capture request first to the COI daemon, which in turn forwards the request to the offload process through the pipe opened in snapify_pause( ) The snapshot of the offload process can be captured by any application-transparent checkpoint tool. Our current implementation uses BLCR to capture the snapshot of the offload process. When the offload process receives the capture request from the pipe, it calls BLCR's.

When the snapshot is captured, the offload process sends back the completion message using the pipe to the COI daemon, which in turn informs the host process. The snapshot of the offload process is saved on the host file system. The snapshot is written by the checkpoint and restart tool running on the coprocessor. Notice that snapify_capture( ) is a non-blocking function call. It returns immediately with a semaphore m_sem in snapify_t* data structure. The caller can thereafter call snapify_wait( ) with the snapify_t structure to wait for the completion of the capturing operation. The semaphore will be signaled when the host process receives the complete message from the COI daemon.

A description will now be given for saving snapshots on the host, and retrieving the snapshots from the host for transfer to the many-core processors.

This invention, called SCIFIO, lets a user create a standard UNIX file descriptor that represents a file on a remote file system. The file descriptor can be passed into standard file I/O system calls like write( ) and read( ).

This method can be used to speed up the time of checkpointing and restarting a process running on a Xeon Phi coprocessor. It is intended to be transparently integrated with an existing checkpoint and restart system. In particular, the method allows the existing checkpoint and restart system, without any modification, to store and retrieve the snapshots directly and efficiently to the host file system on Intel Xeon Phi servers.

SCIFIO is a remote file access service that transfers data using remote memory direct access (RDMA) between the host and the Xeon Phi devices on a Xeon Phi server. SICFIO provides a simple interface that uses UNIX file descriptors as data access handles. SICFIO allows a local process running on a Xeon Phi device to read from or write to a remote file on the host through standard file I/O functions, as if the file is local. For example, the file descriptor created by SCIFIO can be directly passed to BLCR for saving and retrieving snapshots. Internally, SICFIO transfers the data over the PCI-e bus using SCIF's RMA data transfer functions.

Figure 3:
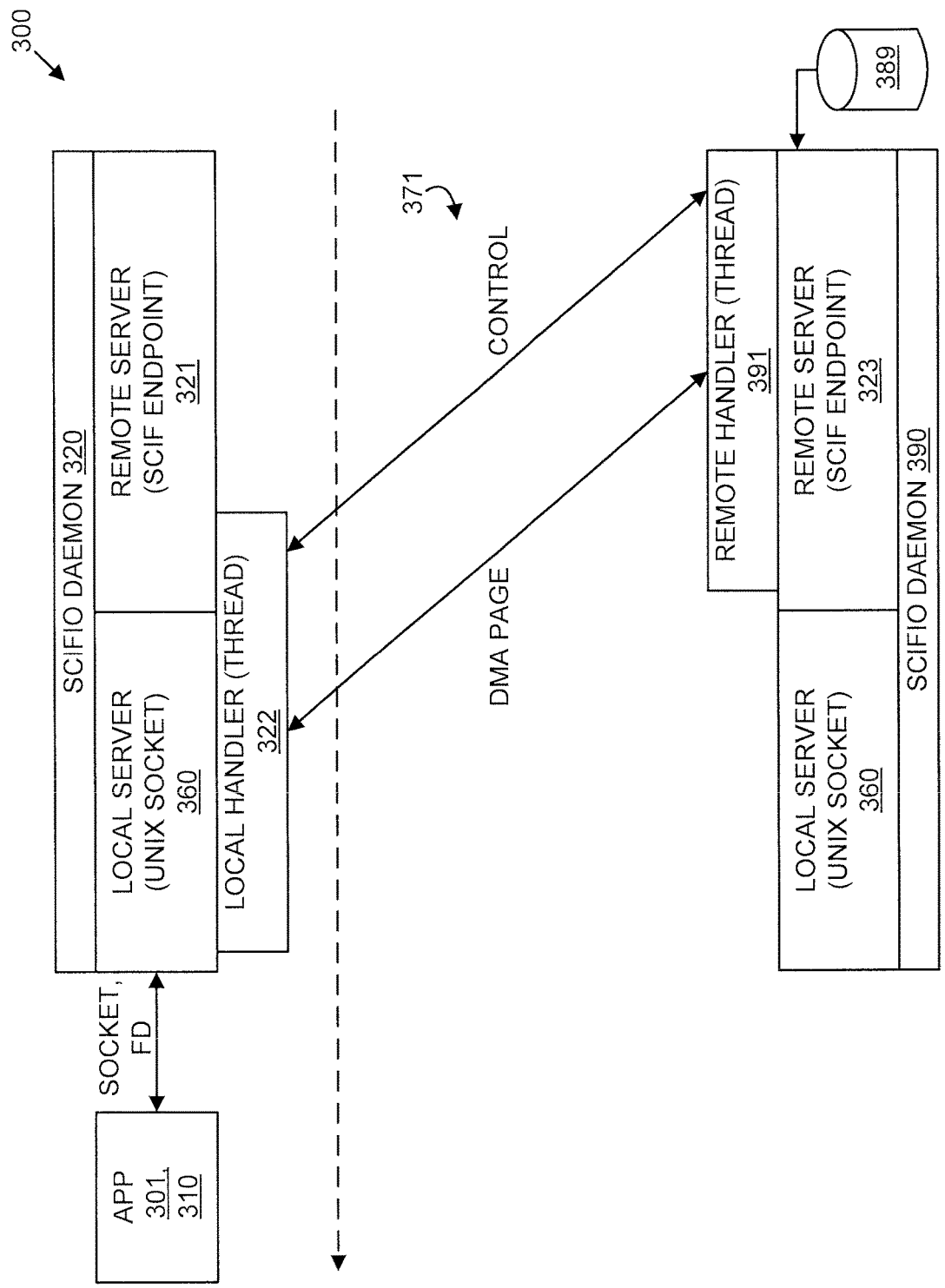
FIG. 3 shows an exemplary architecture of SCIFIO 300, in accordance with an embodiment of the present principles.

FIG. 3 shows an exemplary architecture of SCIFIO 300, in accordance with an embodiment of the present principles. SCIFIO 300 includes at least the following two components: a user-level library 310 providing a simple I/O interface (SCIFIO library); and a standalone binary called SCIFIO daemon 320. The SCIFIO library 310 is linked to the user code that wants to use SCIFIO for remote file I/O, while each SCIF node (the host and any of the Xeon Phi devices Xeon Phi server) runs a SCIFIO daemon 320 as a longrunning process. The SCIFIO daemon 320 serves I/O requests from both the local user processes using the SCI- FIO library 310 and remote SCIFIO daemons 390. The SCIFIO daemon 320 can receive data from a local process, and transfer the data to a remote SCIFIO daemon 390, which in turn saves the data into a remote file system 389. Alternatively, the SCIFIO daemon 320 can retrieve data from a local file system, and transfer the data to a remote SCIFIO daemon 390, which further feeds the data into a remote user process.

The SCIFIO library 310 is designed for transparent integration with the standard read( ) and write( ) system calls. The SCIFIO library's only API function scifio_open( ) returns a standard UNIX file descriptor. It accepts the following three arguments: a SCIF node ID; a path to a file that is valid on the remote SCIF node; and a file access mode flag indicating either a read or write mode (but not both). The returned file descriptor represents a file on a (remote) SCIF node as specified by the arguments.

SICFIO uses a UNIX socket 360 as the local communication channel between the SICFIO library and the SICFIO daemon. When scifio_open( ) is called, the SICFIO library connects to a UNIX socket 360 to the local SICFIO daemon 320. Once the communication on the UNIX socket 360 is established, scifio_open( ) sends the SCIF node ID, the file path, and the access mode to the SICFIO daemon 320. Finally scifio_open( ) returns a handle of the connection to the UNIX socket 360 as file descriptor to the caller. To serve the local socket connections, the SICFIO daemon has a local server thread 321. Once the server thread 321 accepts the socket connection from the SICFIO library 310, it spawns a local handler thread 322 to handle further I/O activities coming from the user process 301, which may either write to or read from the socket, depending on the access mode. Notice that the file descriptor returned by scifio_open( ) is simply a regular UNIX file descriptor, so the user code simply calls close( ) system call to release the resources associated with the file descriptor.

The communication channel 371 between two SICFIO daemons 320 and 390 is a SCIF connection. After receiving the SCIF node ID, the file path, and the access mode from a local user process, the SICFIO daemon's local handler thread 322 will create a new SCIF connection to the SICFIO daemon 390 on the specified SCIF node. Once the SCIF connection is established, the local handler thread 322 will forward the path and the access mode of the file to the remote SICFIO daemon 390, and register an internal buffer to the SCIF library 310 for RMA transfer. The buffer size is configurable. To balance between the requirement of minimizing memory footprint and the need of shorter transfer latency, the buffer size is set at 4 MB. Of course, other buffer sizes can be used. To handle incoming SCIF connections, the SICFIO daemon 320 employs a remote server thread 323, which listens to a predetermined SCIF port.

Once the remote server thread 323 accepts a SCIF connection from a remote SICFIO daemon 390, it spawns a remote handler thread 391 to handle communications over the newly established SCIF channel 371.

Once the communication channels are established, the local handler thread 322 will start to direct the data flow between the user application and the remote file. In write access mode, the local handler thread 322 will copy the data written to the socket by the user application to the registered RMA buffer. After the buffer is filled, the local handler thread 322 will send a SCIF message to notify the remote SICFIO daemon 390 (i.e. the daemon's remote handler thread 391) using scif_send( ) Subsequently the remote handler thread 322 will use SCIF's RMA function scif_vreadfrom( ) to read the data from the registered RMA buffer, and saves the data to the file system at the specified location. After the RMA completes, the local handler thread 322 will reuse the RMA buffer and repeat the above process until all data from the user process are saved to the remote file. In the read access mode, the data flow in the reverse direction. The remote handler thread 391 in the remote SCIFIO daemon will read data from the specified file, and copy the data to the registered RMA buffer using scif_vwriteto( ) Once the buffer is filled, it will notify the local handler thread 322 in the local SCIFIO daemon 320, which in turn will copy the data from the RMA buffer to the socket 360.

Snapify uses SCIFIO to save and retrieve snapshots. The Snapify library is linked with the SICFIO library. To take a snapshot of an offload process, Snapify calls scifio_open( ) in write mode in the pre-snapshot phase. The returned file descriptor is then passed to BLCR, which uses it to write the context file. Similarly, to restart an offload process Snapify calls scifio_open( ) to open a remote context file in read mode. The returned file descriptor is then used by BLCR to load the process context from the remote file to the local Xeon Phi's memory. Thanks to SCIFIO, the data transfer between a Xeon Phi device and the context file in the host's file system is completely transparent to BLCR. In addition, the offload process, which is linked with the SCIFIO library, does not introduce extra SCIF connections. Therefore the remote file access enabled by SCIFIO does not complicate the process of taking a snapshot.

A description will now be given of some of the many attendant competitive/competitive values of the present principles.

The checkpoint-and-restart (CR) will be the first solution of a general approach to achieve reliability for offload-based applications on Xeon Phi-based servers, clusters, and supercomputers.

The process swapping and migration allows higher utilization, less wait time, and flexibility in server resource management and job scheduling. In addition, process migration can also increase reliability by preemptively migrating a process from a failing Xeon Phi hardware device to a healthy Xeon Phi hardware device.

A description will now be given regarding some of the many attendant advantages/features of the present principles not addressed or considered by the prior art.

Checkpoint and restart, swap, and migration of offload applications using Xeon Phi are important to the cluster's reliability and efficiency. Yet there is no known solution on many-core processors for checkpoint and restart and process migration, and the existing swap mechanism is ineffective and too slow.

The protocol conducted by the host process, its associated offload process, and coi_daemon ensures that when the communication are disconnected, coi_daemon understands that a snapshot procedure is taking place and will not interrupt the snapshot by terminating the offload process.

A description will now be given regarding checkpoint and restart, in accordance with an embodiment of the present principles.

To take a checkpoint of an offload application we need to capture both the snapshots of the host process and of the offload process. To capture a snapshot of the host process, we can use an application-transparent checkpoint and restart tool like BLCR on the host. As to the snapshot of the offload process, we use snapify_pause( ) and snapify_capture( ) in Snapify's API.

The sample code in TABLE 2 shows how Snapify's API can be combined with the host BLCR to implement checkpoint and restart for offload applications. The function snapify_blcr_callback( ) is a callback function that is registered to BLCR on the host. When BLCR receives a checkpoint request, it will call snapify_blcr_callback( ). Within snapify_blcr_callback( ) we call BLCR's cr_checkpoint( ) to take a snapshot (a checkpoint) of the host process. Before cr_checkpoint( ) we call snapify_pause( ) and snapify_capture( ) to take a snapshot of the offload process. Notice that snapify_capture( ) is a non-blocking call. Therefore we need to wait for its return in the "continue" section of the if statement after cr_checkpoint( ) returns.

In restarting BLCR first restores the host process. The execution of the restored host process will begin after cr_checkpoint( ) returns with ret>0. The control flow of the execution will go through the "restart" section of the "if" statement. There we call snapify_restore( ) to recreate the offload process. In the sample code the offload process will be restored on a Xeon Phi coprocessor whose device ID is extracted from COIProcess* by function GetDeviceID( ).

TABLE 2

```
int snapify_blcr_callback (void* args( {
        int ret = 0;
        snapify_t* snapshot = (snapify_t*) args;
        snapify_pause (snapshot);
        snapify_capture (snapshot, false);
        ret=cr_checkpoint (0);
        if (ret>0) {//Restarting.
                snapify_restore (snapshot, GetDevicedId
                (snapshot->m_process));
                        //save snapshot.m_process.
        }
        else {//Continue.
                snapify_wait(snapshot);
                snapify_resume(snapshot);
        }
}
```

Figure 4:
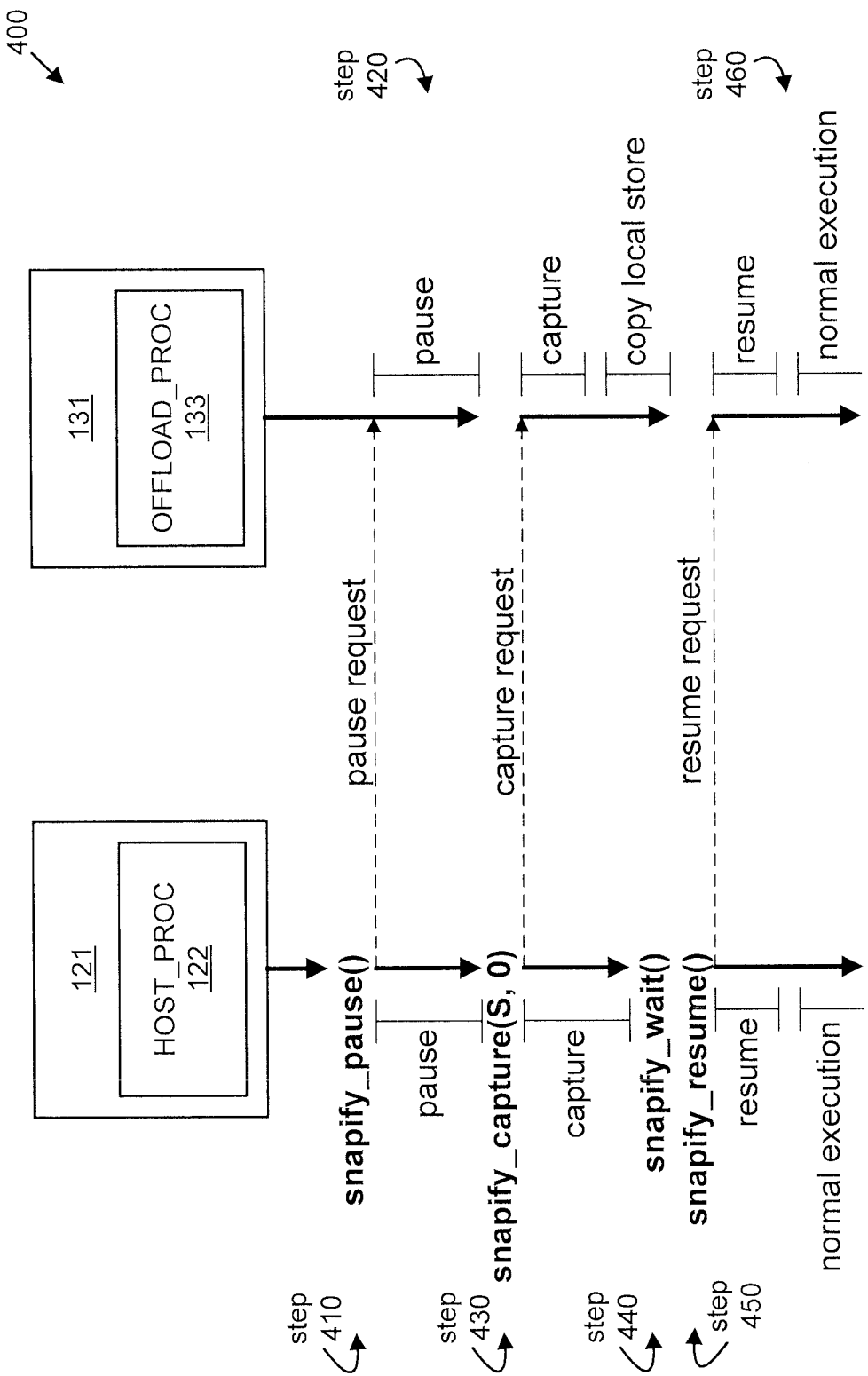
FIG. 4 shows an exemplary method 400 for checkpoint for many-core coprocessors, in accordance with an embodiment of the present principles.

FIG. 4 shows an exemplary method 400 for checkpoint for many-core FIG. 4 shows an exemplary method 400 for checkpoint for many-core coprocessors, in accordance with an embodiment of the present principles. The method 400 involves a host process 122 running on a host processor (e.g., host processor 121) and an offload process 133 running on a coprocessor (e.g., coprocessor 131).

At step 410, the host processor 121 issues a snapify_pause request to the coprocessor 131.

At step 420, the coprocessor 131 pauses.

At step 430, the host processor 121 issues a snapify_capture(S,0) request to the coprocessor 131. The host processor 121 will then capture a snapshot and the coprocessor 131 will also capture a snapshot and copy the snapshot to its local store.

At step 440, the host processor 121 issues a snapify_wait( ) to the coprocessor 131.

At step 450, the host processor 121 issues a snapify_resume( ) to the coprocessor 131.

At step 460 the host processor 121 and the coprocessor 131 resume normal operation.

Figure 5:
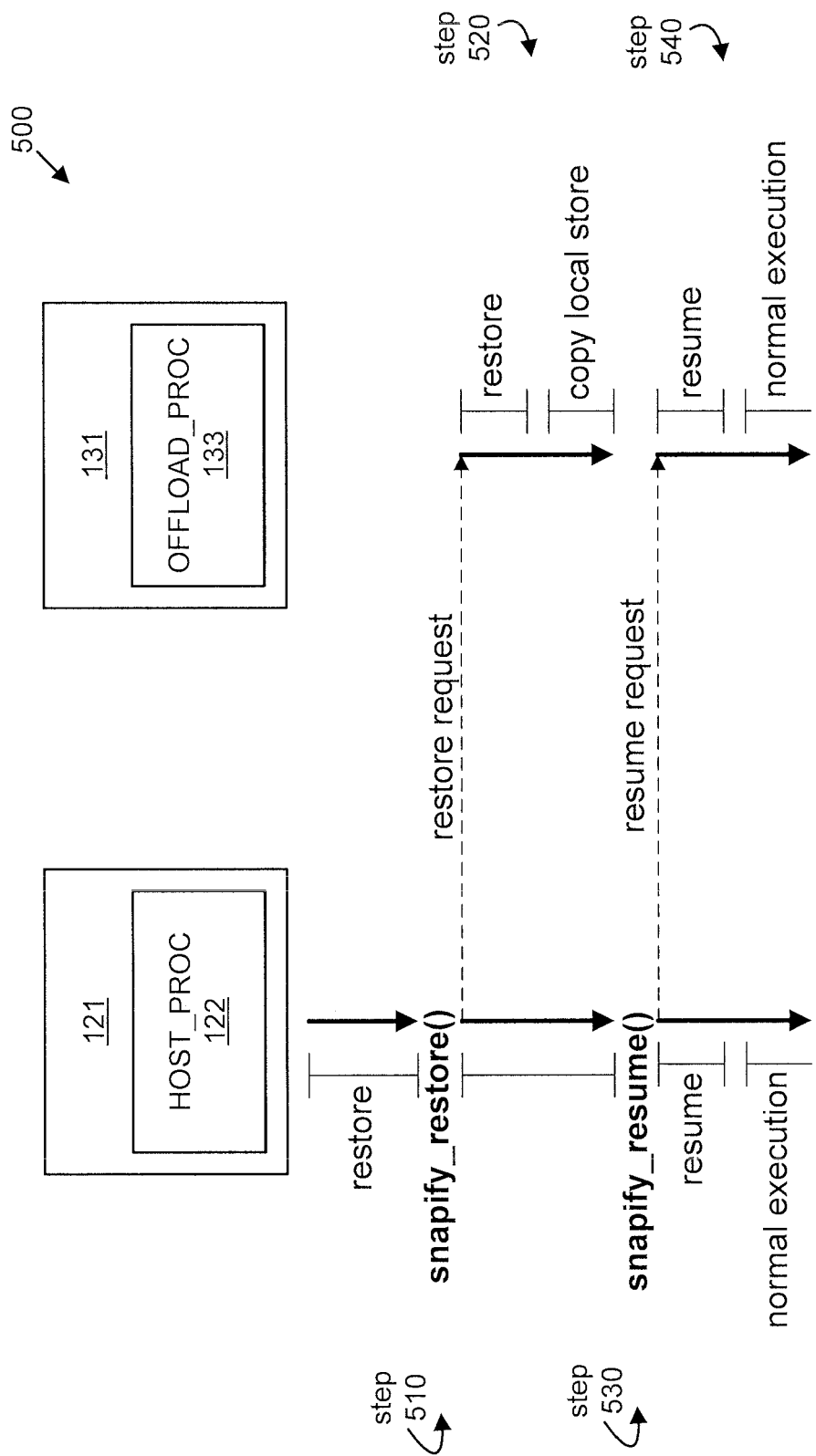
FIG. 5 shows an exemplary method 500 for restart for many-core coprocessors, in accordance with an embodiment of the present principles.

FIG. 5 shows an exemplary method 500 for restart for many-core coprocessors, in accordance with an embodiment of the present principles. The method 500 involves a host process 122 running on a host processor (e.g., host processor 121) and an offload process 133 running on a coprocessor (e.g., coprocessor 131).

At step 510 the host processor 121 issues a snapify_restore request to the coprocessor 131.

At step 520, the coprocessor 131 performs a restore operation to restore a previous state and places a copy of the current or restored state in its local store.

At step 530, the host processor 121 issues a snapify_resume( ) request to the coprocessor 131.

At step 540, the host processor 121 and the coprocessor 131 resume normal operation.

A description will now be given regarding process swapping, in accordance with an embodiment of the present principles.

Process swapping can be used, for example, by a job scheduler to swap out one offload process and swap in another based on the scheduler's scheduling and resource management policies. Both of the swapping functions are called in the context of the host process. The caller of snapify_swapout( ) needs to prepare a directory where the snapshot files of the offload process can be stored, and passes the path in parameter snapshot to snapify_swapout( ) The implementation of snapify_swapout( ) is fairly straight-forward: we call snapify_pause( ) snapify_capture( ) and snapify_wait( ) one by one. Since the offload process is to be swapped out, we set the second parameter of snapify_capture( ) to be true, terminating the offload process after its snapshot is captured and saved. The returned pointer of snapify_t structure from snapify_swapout( ) represents a snapshot of the offload process. It can be used to restore the offload process.

The swapping-in of an offload process reverses the effect of swapping-out. In snapify_swapin( ) we use snapify_restore( ) to restore the offload process. The returned Snapify data structure snapshot from snapify_swapout( ) is passed to snapify_swapin( ) which uses the path of the snapshot files in snapshot to restart the offload process on the specified Xeon Phi coprocessor (identified by device_to parameter). The new handle to the restored offload process is returned at the end of snapify_swapin( ).

The sample code in TABLE 3 shows the use of Snapify's API to implement process swapping.

TABLE 3

```
snapify_t* snapify_swapout (const char* path, COIProcess* proc) {
        snapify_t* snapshot = (snapify_t*) malloc (Sizeof (snapify_t));
        snapshot->m_snapshot_path = path;
        snapshot->m_process = proc;
        snapify_pause (Snapshot);
        snapify_capture (snapshot, true);
        snapify_wait (snapshot);
        Return snapshot;
}
COIProcess* snapify_swapin (snapify_t* snapshot, int device) {
        COIProcess* ret = 0;
        snapify_restore (Snapshot; device);
        snapify_resume (snapshot);
        ret=snapshot->m_process;
        free (snapshot);
        return ret;
}
```

Figure 6:
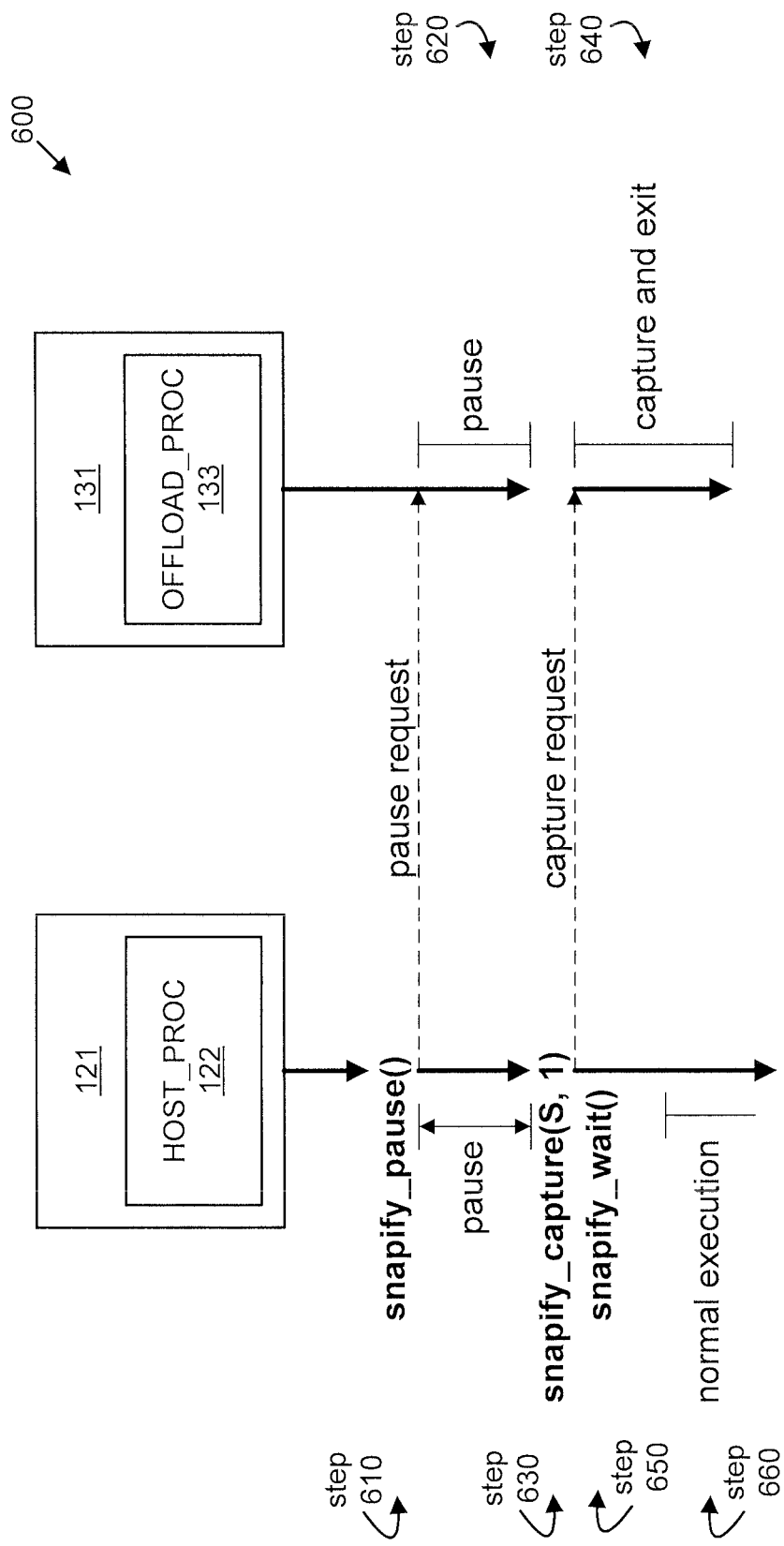
FIG. 6 shows an exemplary method 600 for process swapping-out for many-core coprocessors, in accordance with an embodiment of the present principles.

FIG. 6 shows an exemplary method 600 for process swapping-out for many-core coprocessors, in accordance with the present principles. The method 600 involves a host process 122 running on a host processor (e.g., host processor 121) and an offload process 133 running on a coprocessor (e.g., coprocessor 131).

At step 610, the host processor 121 issues a snapify_pause( ) request to the coprocessor 131.

At step 620, the coprocessor 131 pauses.

At step 630, the host processor 121 issues a snapify_capture(S, 1) request to the coprocessor 131.

At step 640, the coprocessor 131 captures a snapshot and exits.

At step 650, the host processor 121 issues a snapify_wait( ) to the coprocessor 131.

At step 660, the host processor 121 resumes normal operation.

Figure 7:
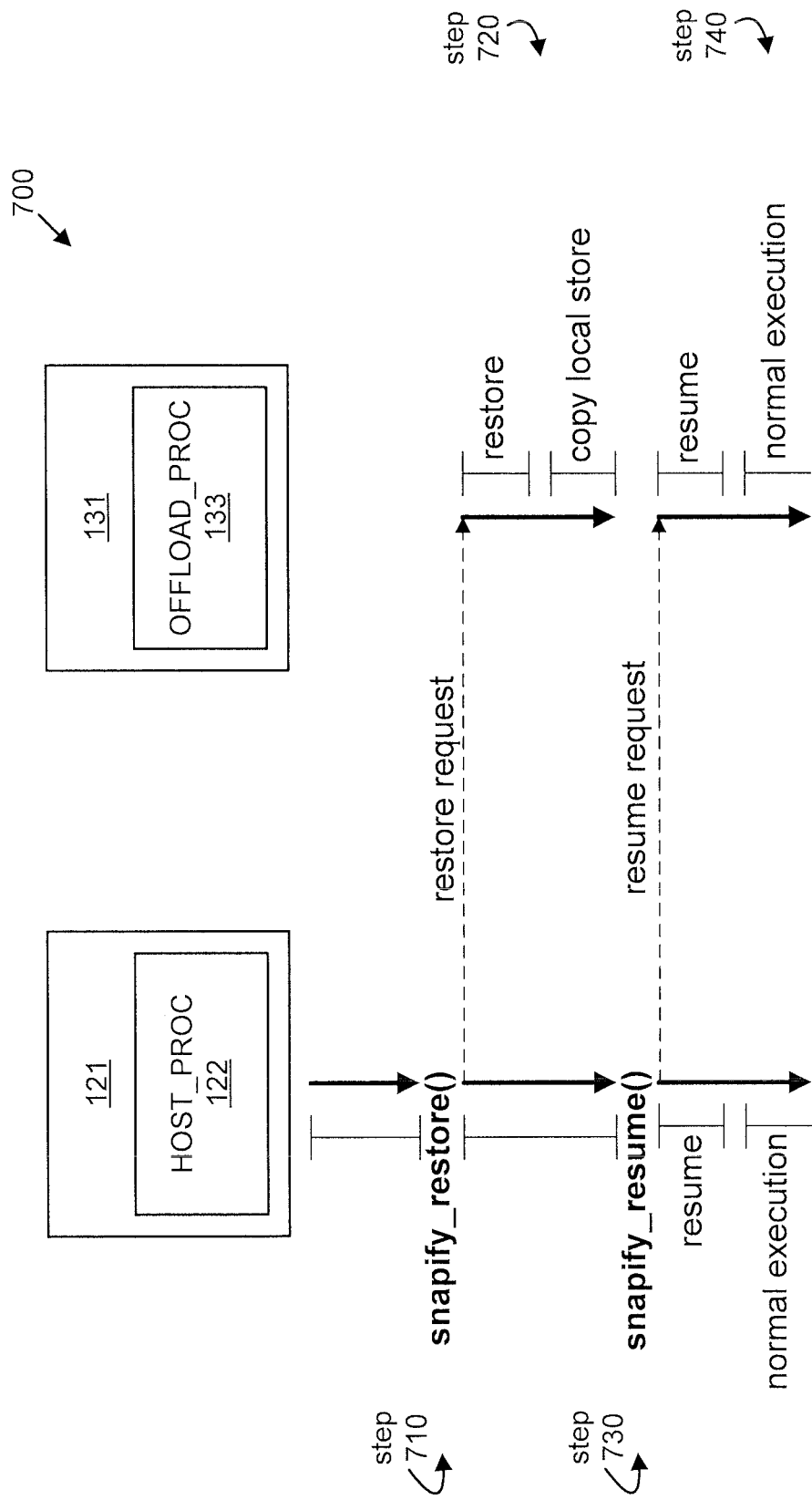
FIG. 7 shows an exemplary method 700 for process swapping-in for many-core coprocessors, in accordance with an embodiment of the present principles.

FIG. 7 shows an exemplary method 700 for process swapping-in for many-core coprocessors, in accordance with an embodiment of the present principles. The method 700 involves a host process 122 running on a host processor (e.g., host processor 121) and an offload process 133 running on a coprocessor (e.g., coprocessor 131).

At step 710, the host processor 121 issues a snapify_restore request.

At step 720, the coprocessor performs a restore operation to restore a previous state and places a copy of the current or restored state in its local store.

At step 730, the host processor 121 issues a snapify_resume( ) request to the coprocessor 131.

At step 740, the host processor 121 and the coprocessor 131 resume normal operation.

A description will now be given regarding process migration, in accordance with an embodiment of the present principles.

Process migration moves an offload process from one coprocessor to another on the same machine. It can be viewed as swapping out the offload process from coprocessor 1 and swapping it in on coprocessor 2. Its implementation simply reuses snapify_swapout( ) and snapify_swapin( ).

The sample code in TABLE 4 shows the use of Snapify's API to implement process migration.

TABLE 4

```
COIProcess* snapify_migration (COIProcess* proc, int device_to) {
    const char* path = "/tmp";
    snapify_t* snapshot = snapify_swapout (path, proc);
    return snapify_swapin (snapshot, device_to);
}
```

Figure 8:
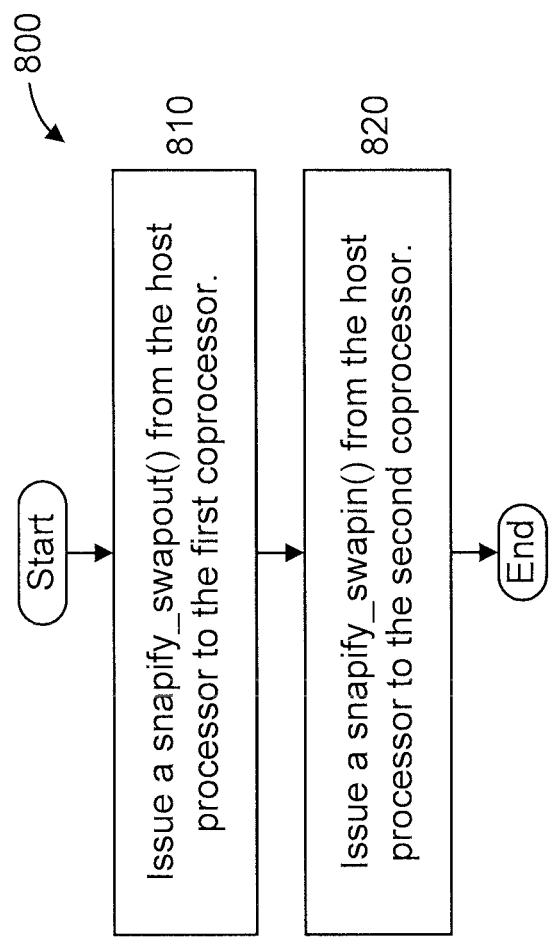
FIG. 8 shows an exemplary method 800 for process migration for many-core coprocessors, in accordance with an embodiment of the present principles.

FIG. 8 shows an exemplary method 800 for process migration for many-core coprocessors, in accordance with an embodiment of the present principles. The method 800 involves a host processor, a first coprocessor, and a second coprocessor.

At step 810, issue a snapify_swapout( ) from the host processor to the first coprocessor.

At step 820, issue a snapify_swapin( ) from the host coprocessor to the second coprocessor.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method, comprising:
    capturing a snapshot of an offload process being executed by one or more many-core processors, the offload process being in signal communication with a host process being executed by a host processor, at least the offload being in signal communication with a monitoring process;
    executing a communication channel emptying method, by a process on one end of a communication channel, to empty the communication channel, the emptying method comprising:
        forming a consistent global state by collaboration between the host process, a Coprocessor Offload Infrastructure (COI) daemon, and the offload process; and
        blocking one or more threads in the host process and the offload process to prevent use of existing Symmetric Communications InterFace (SCIF) channels between the host process and the offload process;
    terminating the offload process on the one or more many-core processors, by the monitor process responsive to a communication between the monitor process and the offload processing being disrupted; and
    simultaneously executing multiple processes whose aggregate memory footprint exceeds physical memory on the processors by swapping out the offload process and swapping in another offload process based on scheduling and resource management policies, wherein the snapshot comprises a respective predetermined minimum set of information required to restore a same state of the process as when the snapshot was taken, and wherein the swapping out comprises preemptively migrating the offload process from a failing processor to a healthy processor.

2. The method of claim 1, further comprising executing a snapshot correctness ensuring method, by at least one of the host process, the offload process, and the monitor process, to ensure correct snapshots.

3. The method of claim 1, wherein the communication channel emptying method comprises a two-ended message transmission confirmation method for ensuring that resulting snapshots of both sides of the communication channel are in agreement regarding whether a message was sent or not sent.

4. The method claim 2, further comprising executing a communication channel disconnecting method, by a process on one end of a communication channel, to disconnect from the communication channel.

5. The method of claim 1, further comprising executing a post-snapshot execution-resuming method, by at least one of the host process, the offload process, and the monitor process, to resume execution after the snapshot is taken.

6. The method of claim 1, further comprising executing an offload process execution restarting method, by at least one of the host process, the offload processes, and the monitor process, to restart an execution of the offload process from the snapshot.

7. The method of claim 6, wherein the offload process execution restarting method comprises sending information through the monitor process to the offload process to reestablish the communication channels with the host process.

8. The method of claim 1, further comprising executing a host process execution restarting method, by at least one of the host process, the offload process, and the monitor process, to restart an execution of the host process from the snapshot.

9. A non-transitory article of manufacture tangibly embodying a computer readable program which when executed causes a computer to perform the steps of claim 1.

* * * * *